US008339591B2

(12) United States Patent
Volanthen et al.

(10) Patent No.: US 8,339,591 B2
(45) Date of Patent: Dec. 25, 2012

(54) APPARATUS FOR INTERROGATING FIBRE BRAGG GRATINGS

(75) Inventors: Mark Volanthen, Southampton (GB); Glynn Lloyd, Birmingham (GB)

(73) Assignee: Moog Insensys Limited, Fareham, Hampshire (GB)

( * ) Notice: Subject to any disclaimer, the term of this patent is extended or adjusted under 35 U.S.C. 154(b) by 33 days.

(21) Appl. No.: 12/578,968

(22) Filed: Oct. 14, 2009

(65) Prior Publication Data

US 2010/0128258 A1 May 27, 2010

(30) Foreign Application Priority Data

Oct. 15, 2008 (GB) .................................. 0818880.7

(51) Int. Cl.
*G01N 21/00* (2006.01)
*G02B 6/00* (2006.01)
*G01J 1/04* (2006.01)
*G01J 1/42* (2006.01)
*G01J 5/08* (2006.01)

(52) U.S. Cl. ....... 356/73.1; 385/12; 385/13; 250/227.14

(58) Field of Classification Search .................... None
See application file for complete search history.

(56) References Cited

U.S. PATENT DOCUMENTS

| 5,680,489 | A | * | 10/1997 | Kersey | 385/12 |
|---|---|---|---|---|---|
| 5,760,391 | A | | 6/1998 | Narendran | |
| 5,987,197 | A | * | 11/1999 | Kersey | 385/24 |
| 6,122,305 | A | * | 9/2000 | Putnam et al. | 372/94 |
| 6,212,306 | B1 | * | 4/2001 | Cooper et al. | 385/12 |
| 6,594,410 | B2 | * | 7/2003 | Kersey et al. | 385/15 |
| 6,678,080 | B2 | * | 1/2004 | Tervonen et al. | 398/82 |
| 6,785,004 | B2 | * | 8/2004 | Kersey et al. | 356/478 |
| 6,990,273 | B2 | * | 1/2006 | Zervas | 385/37 |
| 6,995,352 | B2 | * | 2/2006 | Hay et al. | 250/227.14 |
| 7,050,676 | B2 | * | 5/2006 | Adachi et al. | 385/37 |
| 7,109,471 | B2 | * | 9/2006 | Taverner | 250/227.14 |
| 7,127,132 | B1 | * | 10/2006 | Moslehi et al. | 385/12 |
| 7,190,858 | B1 | * | 3/2007 | Greiner et al. | 385/37 |
| 7,961,325 | B2 | * | 6/2011 | Palmskog et al. | 356/433 |

(Continued)

FOREIGN PATENT DOCUMENTS

GB 2419184 4/2006

(Continued)

OTHER PUBLICATIONS

Volanthen et al., "Low coherence technique to characterise reflectivity, and time delay as a function of wavelength within a long fibre grating," 1996, Electronics Letters, vol. 32, No. 8, pp. 757-758.*

(Continued)

*Primary Examiner* — Gordon Stock, Jr.
(74) *Attorney, Agent, or Firm* — Renner, Otto, Boisselle & Sklar, LLP

(57) ABSTRACT

Apparatus for interrogating an optical fiber comprising a plurality of fiber Bragg gratings each having a resonant wavelength in a different discrete wavelength band. The apparatus comprises a delay arrangement interposed in use in an optical path for light supplied to and/or reflected from the fiber Bragg gratings. The delay arrangement is configured to apply a different time delay to light in each of the discrete wavelength bands, whereby the light reflected from each of the fiber Bragg gratings is received at an interrogator port of the apparatus in a different discrete time interval.

14 Claims, 2 Drawing Sheets

U.S. PATENT DOCUMENTS

2002/0176658 A1* 11/2002 Prohaska .................... 385/24
2004/0113056 A1 6/2004 Everall et al.
2004/0175188 A1* 9/2004 Bellemare et al. ............ 398/186
2007/0024857 A1* 2/2007 Menezo .................... 356/478
2007/0154130 A1 7/2007 Tam et al.
2010/0103426 A1* 4/2010 Kim et al. .................... 356/446

FOREIGN PATENT DOCUMENTS

| GB | 2432947 A * | 6/2007 |
|---|---|---|
| GB | 2440953 | 2/2008 |
| WO | WO 03106929 A1 * | 12/2003 |
| WO | 2004/056017 | 7/2004 |

OTHER PUBLICATIONS

United Kingdom Search Report for corresponding application No. GB0818880.7 dated Jan. 27, 2009.

* cited by examiner

APPARATUS FOR INTERROGATING FIBRE BRAGG GRATINGS

FIELD OF THE INVENTION

This invention relates to apparatus for interrogating fibre Bragg gratings (FBGs).

BACKGROUND TO THE INVENTION

Optical fibre strain sensors are known and WO 2004/056017 discloses a method of interrogating multiple fibre Bragg grating strain sensors along a single fibre. In the system of WO 2004/056017, Bragg gratings are defined in the optical fibre at spaced locations along the optical fibre. When the optical fibre is put under strain, the relative spacing of the planes of each Bragg grating changes and thus the resonant optical wavelength of the grating changes. By determining the resonant wavelength of each grating, a strain measurement can be derived for the location of each grating along the fibre. The light reflected from each fibre Bragg grating is identified by the time of arrival of a reflected light pulse at a detector, such that the reflected signals from multiple gratings in a single fibre are multiplexed in the time domain.

A problem with existing time-division multiplexing (TDM) devices is that due to the operating speeds of the electronics in the TDM instrument, the sensors, or fibre Bragg gratings, must be placed at relatively large distances apart so that the electronics is not bombarded with multiple return signals at any one moment. Typically, the electronics cannot cope with signals returning from spacings between sensors of less than 1 meter as the signals arrive too quickly for the electronics to analyse one signal before the next arrives.

One solution to this problem is to use wavelength division multiplexing (WDM). In this case, each grating in a single optical fibre has a resonant wavelength in a different discrete wavelength band. In this way, the reflected light from each grating can be identified by the resonant wavelength of light reflected, which means there is no limitation on the location of the gratings along the fibre. However, for such a system to function effectively every grating in a single fibre must operate in a discrete wavelength band and this imposes limitations on the construction of a sensor system.

The present invention, at least in its preferred embodiment, seeks to obviate one or more of the disadvantages of known interrogation devices.

SUMMARY OF THE INVENTION

Accordingly, the invention is directed to apparatus for interrogating an optical fibre comprising a plurality of fibre Bragg gratings each having a resonant wavelength in a different discrete wavelength band. The apparatus comprises a delay arrangement interposed in use in an optical path for light supplied to and/or reflected from the fibre Bragg gratings. The delay arrangement is configured to apply a different time delay to light in each of the said discrete wavelength bands, whereby the light reflected from each of the fibre Bragg gratings is received at an interrogator port of the apparatus in a different discrete time interval.

By providing a wavelength-selective delay arrangement in the apparatus, the reflected light from each grating can be differentiated at the interrogator by the time of arrival of the pulse of light. In this way, groups of Bragg gratings (of different wavelength bands) can be positioned closer together than would otherwise be possible in a TDM system, but it is not necessary for every grating in the whole fibre to operate in a different wavelength band, as would be the case with a pure WDM system. The effect of the invention is that the sensor gratings in each waveband appear to the interrogator to be spaced further apart from one another than they actually are. Due to the delay module, a relatively large number of sensors may be used in the system, compared to present WDM systems.

Preferably, the delay arrangement comprises optical paths of different lengths for each of the respective discrete wavelength bands. The discrete wavelength bands may be directed down respective optical fibres of different lengths such that light in each wavelength band travels along a paths of a different length. In this way, the time taken to reach the end of the respective optical fibres is different for each wavelength band.

Advantageously, the delay arrangement comprises an optical splitter to direct the light of each wavelength band to the respective optical path. The splitter separates the different wavelength bands from a light pulse and directs each wavelength band along a respective optical path. The optical splitter may comprise a splitter. The delay arrangement may comprises an optical combiner for recombining the light from each of the optical paths. In this way, the delay arrangement may be included conveniently in an existing arrangement.

In one arrangement, the delay arrangement comprises wavelength selective reflectors spaced along a common optical path for reflecting light in each of the said discrete wavelength bands at different points along the optical path. In this case, light in one discrete wavelength band is reflected back along the common optical path whilst the light in the other discrete wavelength bands passes through to further wavelength selective reflectors. The delay arrangement may comprise an optical circulator to direct light along the common optical path. An optical circulator is a device comprising a number of ports that can act as both inlets and outlets for a signal. The signal enters through a first port and exits through the adjacent port. Alternatively, the delay arrangement may comprises an optical coupler to direct light along the common optical path.

The apparatus may further comprise an interrogator connected to the interrogator port and configured to determine the wavelength of light reflected by a plurality of fibre Bragg gratings, with distinct gratings being identified by the time of arrival of a reflected pulse of light, i.e. a TDM interrogator.

The present invention also extends to a method of interrogating fibre Bragg gratings.

BRIEF DESCRIPTION OF THE DRAWINGS

An embodiment of the invention will now be described, by way of example only, and with reference to the accompanying drawings, in which.

DETAILED DESCRIPTION OF EXEMPLARY EMBODIMENTS

Figure 1:
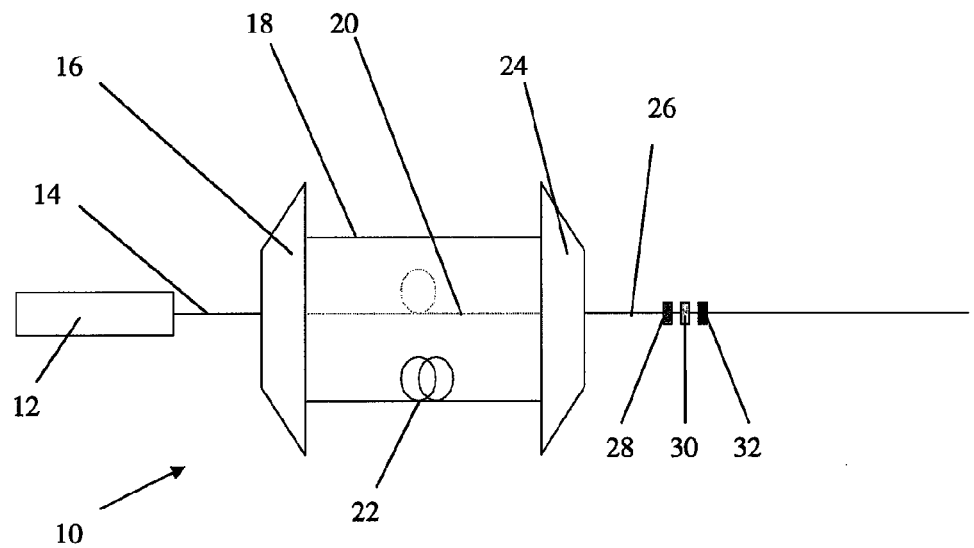
FIG. 1 is a diagrammatic representation of a wavelength selective spool delay arrangement in accordance with the present invention.

FIG. 1 shows apparatus 10 for interrogating fibre Bragg gratings (FBGs) comprising a TDM (time-division multiplexing) interrogator 12 connected to a first end of a first optical fibre 14. The other end of the first optical fibre 14 is connected to a wavelength band splitter/combiner 16. The wavelength band splitter/combiner 16 is connected to one end of three delay coils 18, 20 and 22. The other end of the three delay coils 18, 20, 22 is connected to a wavelength band combiner/splitter 24, which in turn is connected to one 20 end of a second optical fibre 26. The second optical fibre 26 comprises fibre Bragg gratings 28, 30, 32 closely spaced along its length. Each of the fibre Bragg gratings 28, 30, 32 has an operating range of resonant wavelengths in a different discrete wavelength band. Each of the wavelength band splitter/combiners 16, 24 is configured to direct light in the wavelength bands corresponding to each of the fibre Bragg gratings 28, 30, 32 into a respective delay coil 18, 20, 22.

A broadband light pulse is sent from the interrogator 12 and passes through the first optical fibre 14 to the wavelength band splitter 16. The wavelength band splitter/combiner 16 separates the broadband signal into wavelength bands, which are then passed through delay coils 18, 20, 22. The delay coils 18, 20, 22 vary in length so that the wavelength bands are delayed by different amounts of time. The delay coils 18, 20, 22 then feed the wavelength bands into the wavelength band combiner/splitter 24, which recombines the signals into a series of (three) pulses corresponding to each wavelength band and spaced in the time domain due to the delay from the coils 18, 20, 22. The combined pulse train passes into the second optical fibre 26 and passes to the FBGs 28, 30, 32. As the pulse train reaches the FBGs 28, 30, 32, specific wavelengths are reflected back along the second optical fibre 26, passing into the wavelength band combiner/splitter 24, which directs the appropriate wavelengths through the appropriate delay coils 18, 20, 22. The wavelength selected pulses then pass through the wavelength band splitter/combiner 16 and are returned to the TDM interrogator 12. Thus, from a single broadband pulse, the interrogator 12 receives reflected pulses from each grating 28, 30, 32 at the resonant wavelength of that grating with the pulses sufficiently spaced in the time domain that the TDM interrogator can determine the wavelength of each reflected pulse, even though the gratings 28, 30, 32 are physically relatively closely spaced.

Figure 2:
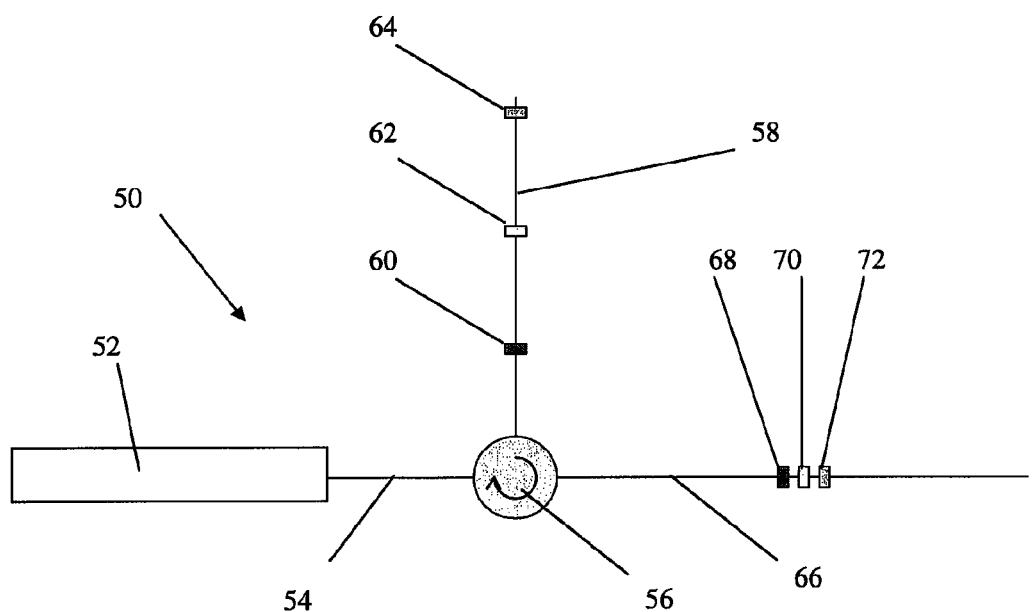
FIG. 2 is a diagrammatic representation of an optical circulator delay arrangement in accordance with the present invention.

FIG. 2 shows apparatus for interrogating fibre Bragg gratings (FBGs) 50 comprising a TDM interrogator 52 connected to one end of a first optical fibre 54. The other end of the optical fibre 54 is connected to an optical circulator 56. The optical circulator 56 is connected to a second optical fibre 58, which is positioned clockwise of the first optical fibre around the optical circulator 56. The second optical fibre 58 comprises reflective FBGs 60, 62, 64 positioned along its length. The optical circulator 56 is further connected to a third optical fibre 66, which is positioned clockwise around the circulator 56 of the second optical fibre 58. The third optical fibre 66 comprises a number of sensor FBGs 68, 70, 72, along its length.

The interrogator 52 emits a broadband light signal into the first optical fibre 54, which passes to the optical circulator 56. The optical circulator 56 distributes the signal to the next available outlet in a clockwise direction, i.e. to the second optical fibre 58. The signal passes along the second optical fibre 58 and predetermined wavelength bands are reflected by the reflective FBGs 60, 62, 64 back to the optical circulator 56. The wavelength bands reflected back to the optical circulator 56 are delayed according to the length traveled along the second optical fibre 58. The signal, now in the form of a series of (three) pulses in distinct wavelength bands, is then passed from the optical circulator 56 to the third optical fibre 66 and passes along the optical fibre 66 until it is reflected by the sensor FGB 68, 70, 72. Upon reflection, the reflected pulses pass back along the third optical fibre 66 to the optical circulator 56 which then directs the signal along the first optical fibre 54 to the interrogator 50.

Figure 3:
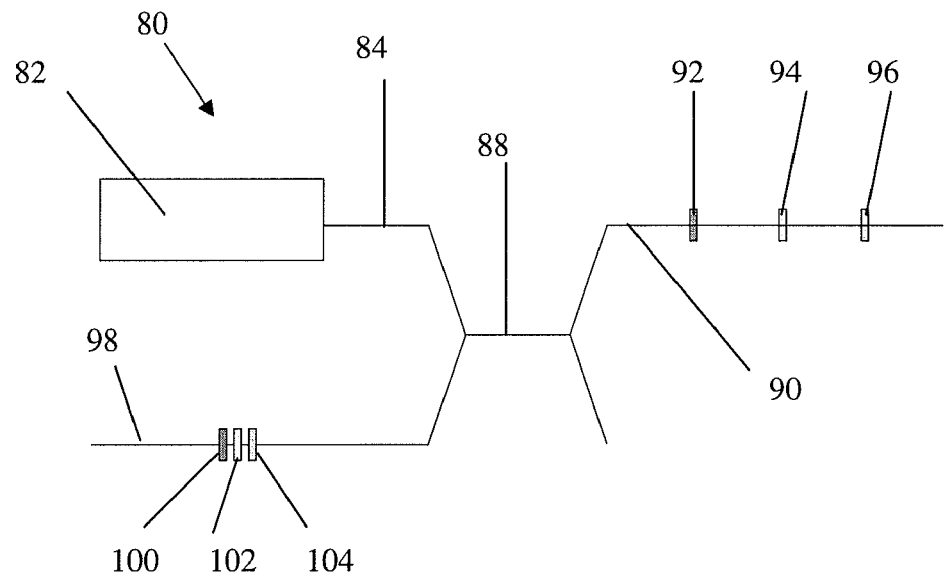
FIG. 3 is a diagrammatic representation of an optical coupler delay arrangement in accordance with the present invention.

FIG. 3 shows apparatus for interrogating fibre Bragg gratings (FBGs) 80 comprising a TDM interrogator 82 connected to one end of a first optical fibre 84. The other end of the first optical fibre 84 is connected to a first port of a coupler 88. A second port of the coupler 88 is connected to a second optical fibre 90 which is provided with reflective FBGs 92, 94, 96. A third port of the coupler 88 is connected to a third optical fibre 98, which is provided with closely positioned sensor FBGs 100, 102, 104.

The TDM interrogator 82 emits a broadband light signal into the first optical fibre 84, which passes through the coupler 88 and is directed to the second port and through the second optical fibre 90. The broadband signal passes along the second optical fibre 90 and reaches the first reflective FBG 92, where a specific wavelength band of the broadband signal is reflected back along the second optical fibre 90 whilst the other wavelength bands of the broadband signal pass along to the next reflective FBG 94, where a second wavelength band is reflected. The reflected wavelength band passes back to the coupler 88 and proceeds to the third optical fibre 98 wherein the sensor FBGs 100, 102, 104 reflect certain wavelengths. The reflected sensor signal passes into the coupler and once more enters the second optical fibre 90, where it proceeds to the appropriate reflective FBG 100, 102, 104 to be reflected back to the coupler 88. The reflected sensor signal passes back to the coupler 88 and is then directed to the interrogator 82. The passage through the second optical fibre 90 introduces a delay in the signal which is enhanced by the second passage through the second optical fibre 90 so that the reflected pulses can be identified by their time of arrival at the interrogator, as in the preceding embodiments.

Figure 4:
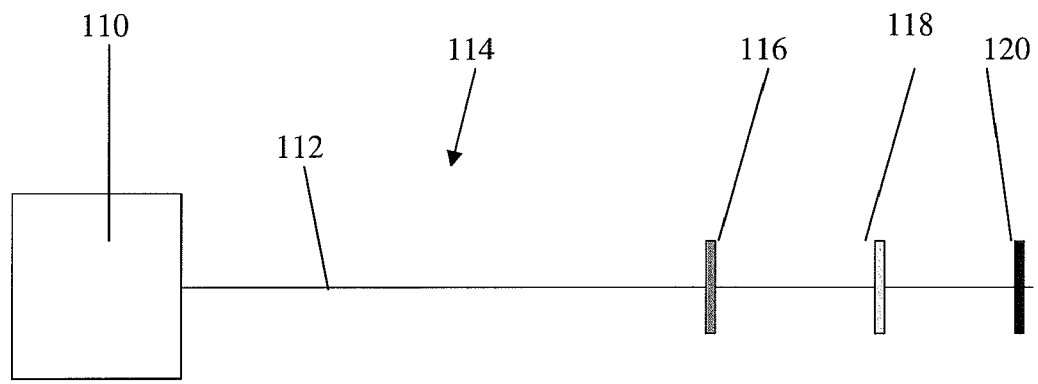
FIG. 4 is a diagrammatic representation of the perceived positioning of the sensors in a device in accordance with the present invention.

FIG. 4 shows how the sensor arrangement 114 appears to the interrogator 110 (12, 52, 82) of FIGS. 1, 2 and 3. Because of the delay arrangement of each embodiment shown in FIGS. 1, 2 and 3, the sensor FBGs 116, 118, 120 appear through the optical fibre to the interrogator 110 (12, 52, 82) to be distantly spaced in a linear configuration.

By using equipment or a method in accordance with the present invention, it is possible to situate the sensor FBGs at a distance of 10 cm apart, rather than 1 meter apart as is usually required. Furthermore, it is possible to arrange groups of ten very closely spaced sensors, for example 1 cm apart or even on top of one another in an optical fibre. For example, a strain gauge rosette and then a meter further down the optical fibre is a further group of sensors at a different location on a structure.

Wavelength bands typically in the range of 1530 nm to 1565 nm, spaced at 5 nm intervals may be the most suitable, that is 1530 nm, 1535 nm, 1540 nm, etc. However, other wavelengths outside this range may be appropriate.

In a preferred embodiment of the method and apparatus of FIG. 1, the delay coils 18, 20 and 22 are sufficiently sized such that a first wavelength band, which passes through delay coil 18, is received before the second wavelength band, which passes through delay coil 20. Furthermore, the second wavelength band is received before third wavelength band, which passes through the delay coil 22.

For example, the delay coil 20 may be substantially equal to the half of the length of the second optical fibre 26, so that the signal in the second delay coil 20, that is the second wavelength band, is delayed for sufficiently long that the entire first wavelength band signals return to the interrogator 12. Similarly, the third delay coil 22 may be substantially equal to the length of the optical fibre 26, to allow the first and second wavelength bands to return to the interrogator 12 before the third wavelength band is returned. By using this method all of the signals from the first returned wavelength can be processed before the signals from the second returned wavelength are received, and all of the second wavelength signals can be processed before the third returned wavelength signals are received. By way of an example only, a typical length of the optical fibre is substantially 100 meters.

Whilst the invention has been described in relation to three sensors and corresponding delay modules, it will be appreciated that the apparatus may comprise any number of sensors and is not intended to be limited to three sensors. Furthermore, a narrowband light source may be used in place of the aforementioned broadband light source.

Numerous other variations and modifications to the illustrated constructions may occur to the reader familiar with the art without taking the device outside the scope of the present invention. For example, the apparatus may comprise one or more of the delay arrangements listed about. For example, a delay spool may be used in combination with a coupler to increase the delay in the signals. Furthermore, a combiner/splitter combination may be used in conjunction with an optical circulator.

In summary, the present application discloses apparatus for interrogating an optical fibre comprising a plurality of fibre Bragg gratings each having a resonant wavelength in a different discrete wavelength band. The apparatus comprises a delay arrangement interposed in use in an optical path for light supplied to and/or reflected from the fibre Bragg gratings. The delay arrangement is configured to apply a different time delay to light in each of the discrete wavelength bands, whereby the light reflected from each of the fibre Bragg gratings is received at an interrogator port of the apparatus in a different discrete time interval.

The invention claimed is:

1. A strain sensing apparatus comprising a time-division multiplexing interrogator, an optical fibre having a plurality of fibre Bragg gratings along its length, each having a resonant wavelength in a different discrete wavelength band, the optical fibre being connected to the time-division multiplexing interrogator and a wavelength selective delay arrangement interposed in an optical path for light supplied to and/or reflected from the fibre Bragg gratings, wherein the delay arrangement is configured to apply a different time delay to light in each of the said discrete wavelength bands prior to the light entering the time-division multiplexing interrogator and wherein, when in use, the light reflected from each of the fibre Bragg gratings is received at an interrogator port of the apparatus in a different discrete time interval.

2. The strain sensing apparatus according to claim 1, wherein the delay arrangement comprises optical paths of different lengths for each of the respective discrete wavelength bands.

3. The strain sensing apparatus according to claim 2, wherein the delay arrangement comprises an optical splitter to split the light into light of each wavelength band and direct the light of each wavelength band along the respective optical path.

4. The strain sensing apparatus according to claim 2, wherein the delay arrangement comprises wavelength selective reflectors spaced along a common optical path for reflecting light in each of the said discrete wavelength bands at different points along the common optical path.

5. The strain sensing apparatus according to claim 3, wherein the delay arrangement comprises an optical combiner for recombining the light from each of said respective optical paths into a single path at a position wherein the light of each different discrete wavelength band will have traveled a different distance along the delay arrangement between the light of each different discrete wavelengths band being split and being recombined.

6. The strain sensing apparatus according to claim 4, wherein the delay arrangement comprises an optical circulator to direct light along the common optical path.

7. The strain sensing apparatus according to claim 4, wherein the delay arrangement comprises an optical coupler to direct light along the common optical path.

8. A method of interrogating an optical fibre comprising a plurality of fibre Bragg gratings spaced along its length, each having a resonant wavelength in a different discrete wavelength band, the method comprising the steps of:
   sending a broadband light pulse from a time-division multiplexing interrogator through the optical fibre such that a plurality of light signals are reflected from the fibre Bragg gratings in the optical fibre, with each reflected signal being in a different discrete wavelength band according to a fibre Bragg grating from which each reflected signal originates; and
   applying a time delay to the light signals in the different discrete wavelength bands;
   wherein, the length of the time delay applied to the light signals in each discrete wavelength band is determined by a wavelength of a light signal, with light signals in each different discrete wavelength band being delayed by a different amount; and
   wherein the time delay is applied using a wavelength-selective delay arrangement interposed in an optical path for light supplied to and/or reflected from the fibre Bragg gratings prior to the reflected light arriving at the interrogator of the fibre, resulting in the reflected light signals arriving at the interrogator having more of a time delay between reflected light signals than a time delay due to the spacing between fibre Bragg gratings, and each discrete separated wavelength arriving at the interrogator at a different discrete time interval, thus giving the fibre Bragg gratings an appearance at the interrogator of being spaced further apart along the length of the optical fibre than their actual physical spacing.

9. A method according to claim 8, wherein the step of applying a time delay to the light signals comprises providing optical paths of different lengths for each of the respective discrete wavelength bands.

10. A method according to claim 9, wherein the step of applying a time delay to the light signals comprises optically separating the light signals in each discrete wavelength band supplied to and/or reflected from the fibre Bragg gratings and directing each along a different optical path to provide the wavelength selective delay to the respective light signal.

11. A method according to claim 9, wherein the reflected light is directed along a common optical path and wavelength selective reflectors are positioned at different positions along that common optical path thereby reflecting light in each of the said discrete wavelength bands at different points along the common optical path.

12. A method claim 10, wherein the step of applying a time delay to the light signals comprises recombining the light signals from each of said different optical paths into a single path.

13. A method according to claim 11, wherein the step of applying a time delay to the light signals comprises directing the light in each discrete wavelength band supplied to and/or reflected from the fibre Bragg gratings using an optical circulator to direct light along the common optical path.

14. A method according to claim 11, wherein the step of applying a time delay to the light signals comprises using an optical coupler to direct light along the common optical path.

* * * * *